(12) United States Patent
Colmenarez et al.

(10) Patent No.: US 7,224,903 B2
(45) Date of Patent: May 29, 2007

(54) UNIVERSAL REMOTE CONTROL UNIT WITH AUTOMATIC APPLIANCE IDENTIFICATION AND PROGRAMMING

(75) Inventors: Antonio J. Colmenarez, Maracaibo (VE); Eric Cohen-Solal, Ossining, NY (US); Mi-Suen Lee, Ossining, NY (US); Daniel Pelletier, Lake Peekskill, NY (US); Ian Lyall McClelland, Waalre (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 1073 days.

(21) Appl. No.: 10/034,667

(22) Filed: Dec. 28, 2001

(65) Prior Publication Data

US 2004/0208588 A1  Oct. 21, 2004

(51) Int. Cl.
*H04B 10/00* (2006.01)
(52) U.S. Cl. .............. 398/106; 398/130; 348/734
(58) Field of Classification Search ........... 348/734; 398/106, 107, 108, 109, 110, 111, 112, 113, 398/114, 130; 340/5.53, 5.83, 148, 161
See application file for complete search history.

(56) References Cited

U.S. PATENT DOCUMENTS

| 4,774,511 A | 9/1988 | Rumbolt et al. ....... 340/825.69 |
| 5,646,608 A | 7/1997 | Shintani ................ 340/825.52 |
| 5,959,751 A | 9/1999 | Darbee et al. ............ 359/148 |
| 6,130,625 A | 10/2000 | Harvey .................. 340/825.72 |
| 6,133,847 A | 10/2000 | Yang ..................... 340/825.22 |
| 6,160,491 A | 12/2000 | Kitao et al. ............ 340/825.69 |
| 6,204,796 B1 | 3/2001 | Chan et al. ................. 341/176 |
| 6,211,870 B1 | 4/2001 | Foster ....................... 345/333 |
| 6,223,348 B1 | 4/2001 | Hayes et al. ................ 725/152 |
| 6,225,938 B1 | 5/2001 | Hayes et al. ................ 341/176 |
| 6,784,918 B1 * | 8/2004 | Ritchie ....................... 348/61 |

FOREIGN PATENT DOCUMENTS

| DE | 10110979 A | 9/2002 |
| WO | WO0135368 | 5/2001 |

OTHER PUBLICATIONS

Real-Time Object Detection For Smart Vehicles by D.M. Gavrila and V. Philomin, Proceedings of IEEE International Conference On Computer Vision, Kerkyra, Greece 1999.
Patent Abstracts of Japan, Hattori Koichi: "Remote Controller," Publication No. 02180497, Jul. 13, 1990, Application No. 63334251, Dec. 30, 1988.

\* cited by examiner

*Primary Examiner*—Christina Leung

(57) ABSTRACT

System and method for automatically programming a universal remote. In the system, the remote acquires identification data from a particular device at which it is pointed. The data is processed to determine command protocols associated with the particular device. Control commands for the particular device input to the remote by a user are formatted according to the command protocols associated with the particular device.

9 Claims, 6 Drawing Sheets

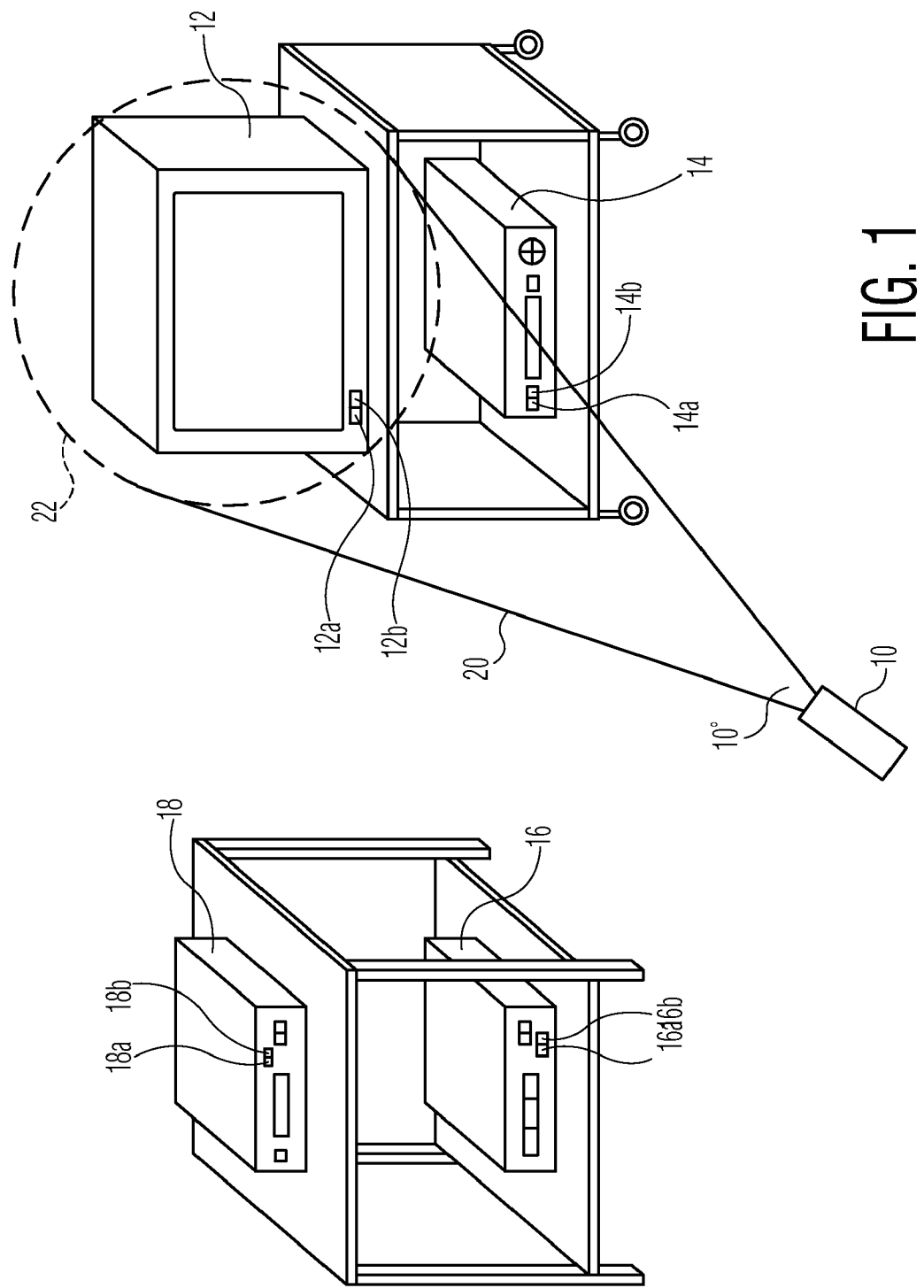

UNIVERSAL REMOTE CONTROL UNIT WITH AUTOMATIC APPLIANCE IDENTIFICATION AND PROGRAMMING

FIELD OF THE INVENTION

The invention relates to remote control units that control appliances, home electronic equipment and the like.

BACKGROUND OF THE INVENTION

Remote control units are commonly available today to control many devices, especially consumer electronic devices. Most of the public is familiar with a remote control unit (often simply referred to as a "remote") for controlling their television sets and VCRs. Other devices such as DVD players, CD players and other home stereo equipment are controllable via remote control devices. Other devices (such as appliances) and systems (such as a home alarm system) may also be controlled by remote control devices.

Remote control units typically operate by emitting a sequence of infrared pulses that are received by the controlled device. The particular sequence provided reflects an encoded command (such as on, off, adjust volume, change channel) that is recognized by the controlled device. (An "encoded command" transmitted between a remote and a particular device will alternatively be referred to as a "command protocol".) When received by the controlled device, the command protocol is recognized and executed by the device. However, when the command protocol for a particular device is received by a different device, generally nothing will occur because the command protocol does not represent a command for that device when decoded.

There are also "universal" remote control units that can be programmed to control a number of different devices, such as a television and a VCR. For such a universal remote, there are a number of buttons that enable the user to select the device to be controlled. (Alternatively, one selection button may be used to scroll through the controlled devices.) After the user selects a device, any commands selected are emitted as a command protocol that is recognized by the selected device. For example, if the user selects "VCR" on a programmed universal remote, the encoded command (command protocol) emitted by the remote will be recognized by the VCR. If the user then selects the command "channel 7" via the remote, the channel signal sent by the remote will be encoded to change the channel setting on the VCR. Decoding of the encoded channel command by the television will generally not be recognized and the television will remain tuned to the same channel.

As noted, universal remotes may be programmed to control a number of devices. Typically a universal remote is sold loaded with a comprehensive database of the command protocols for many available devices. The universal remote may then be programmed via a programming sequence so that the particular command protocols for devices found in the user's home may be selected by the user. For example, the universal remote may be programmed manually by the user by inputting a particular reference number (sometimes referred to as a device's "appliance code") that corresponds to a device in the user's home. The universal remote includes in the database the appliance codes and the associated command protocols for those devices that may be controlled by programming the remote. By inputting the appliance code for a particular device, the remote searches the database for the appliance code and the associated command protocols and uses the command protocols when control commands are subsequently input by the user via the remote. The programming sequence may be conducted for a number of different devices utilizing the corresponding appliance code for each such device. The programming sequence may then also include assigning the command protocols for each programmed device to one of the selection buttons (or the spots assignable using a single button).

Alternatively, some universal remote control units provide a procedure to determine the appliance code of a device in the user's home by sequentially emitting one or more encoded commands for each of the devices in the remote's database and having the user stop the search when the user sees that a command that properly controls the user's device is emitted.

Among the disadvantages of the existing art regarding universal remotes, the user must manually select the device that is to be controlled. Thus, the user must first select the device by depressing a button on the remote, and then select the control command to be sent to the device. This requires a number of manipulations that are inconvenient to the user. For example, a user may be recording a program on channel 2 on the VCR and watching a program on the channel 4 on the television. In such an instance, the user may typically have the television selected on the universal remote, so that the volume may be controlled. If the user wants to change the station being recorded on the VCR, the user must select "VCR" on the remote, depress keys on the remote to change the channel on the VCR, and then select "TV" on the remote so that the volume on the TV may once again be controlled.

In addition, as described above, currently available universal remotes need some type of user involvement during programming. Either the user must input the appliance codes of the devices during the programming sequence or, if the remote automatically emits control commands for all of the appliances in its database, the user must indicate when a control command is emitted that controls one of the user's devices. Both of these procedures add to the complexity of the universal remote, which can often render it unusable for the average consumer.

SUMMARY OF THE INVENTION

It is an objective of the current invention to provide a remote control unit and system that automatically determines which device the user intends to control and automatically switches so that the command protocol corresponding to that selected device are emitted by the remote when the user provides a control command to the remote. It is also an objective to provide a remote control unit and system that automatically determines the appliance code (or otherwise determines the appropriate control protocol) for the selected device, so that no programming by the user is required. In particular, it is an objective of the invention to provide such automatic programming of devices and automatic switching between devices when a number of such devices are located in one room, where the programming of numerous devices and switching between numerous devices can be extremely tedious and cumbersome.

In accordance with these objectives, the invention comprises a remote that is capable of controlling a number of devices. The remote acquires identification data from a particular device at which it is pointed. The data is processed to determine command protocols associated with the particular device. Control commands for the particular device input to the remote by a user are formatted according to the command protocols associated with the particular device.

The invention further comprises a method for controlling one particular device selected from among a number of devices based upon a selection direction. Identification data is acquired from the particular device. Command protocols associated with the particular device are determined using the identification data. Control commands for the particular device are formatted according to the determined command protocols for the particular device.

The invention further includes a system comprised of a number of devices that are controllable via a remote. The remote acquires identification data from the particular device among the number of devices at which the remote is pointed. Each device of the number of devices may, for example, emit identification data identifying the respective device. In that case, identification data of the particular device at which the remote is pointing is selected by the remote. Alternatively, the remote itself may initiate acquisition of the identification data of the particular device at which it is pointed. The identification data for the particular device is processed by the remote to determine command protocols associated with the particular device. Control commands for the particular device input to the remote by a user are formatted according to the command protocols associated with the particular device.

BRIEF DESCRIPTION OF THE DRAWINGS

FIG. 1 is a representative view of an embodiment of the remote control unit and system of the present invention;

FIG. 1b is a representation of a number of components comprising the remote of FIG. 1a;

DETAILED DESCRIPTION

Figure 1A:
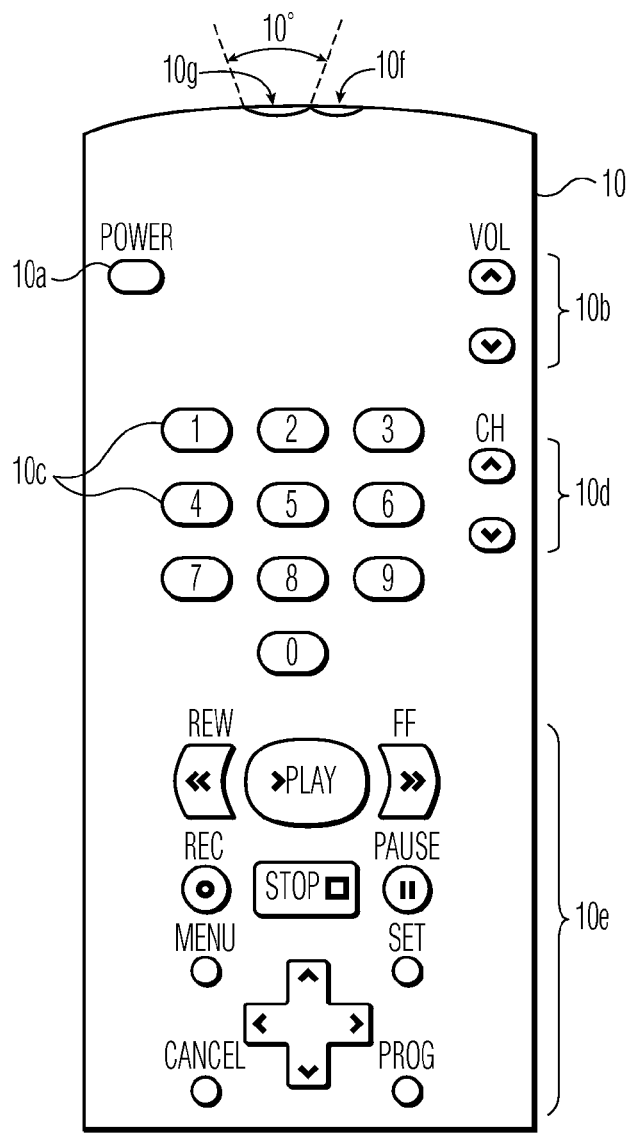
FIG. 1a is a more detailed view of the remote control unit of FIG. 1.

Referring to FIG. 1, a universal remote control unit 10 (simply referred to as a "remote" hereinafter) is shown that incorporates an embodiment of the invention. Remote 10 controls a number of devices, shown in FIG. 1 as television 12, VCR 14, stereo tuner/amplifier 16 and CD player 18. Television 12 and VCR 14 are electrically connected so that recorded programs may be played on the VCR 14 and viewed via the television 12 when appropriate settings and commands are input to the devices, as is well-known in the art. Likewise, stereo tuner/amplifier 16 and CD player 18 are electrically connected, so that CDs may be inserted in the CD player 18 and amplified via the stereo tuner/amplifier 18 for listening.

As will be described further below, after remote 10 is utilized by the user to provide a control command to one of the devices in the manner described below according to the invention (which involves automatic selection and programming of the user's intended device), the remote emits signals according to the command protocol for the selected device. FIG. 1a shows a more detailed exemplary embodiment of remote 10, having various buttons providing a user interface where the user can input commands for a selected device. Among other things, remote 10 includes a power button 10a, volume control buttons 10b, channel input buttons 10c, channel up/down buttons 10d and VCR control buttons 10e (some of which may also be used to control CD player 18). When television 12 is the selected device, for example, depressing volume control buttons 10b on remote will cause the remote to emit volume control commands in accordance with the television's 12 command protocol, thereby changing the volume of the television. As another example, when the stereo tuner/amplifier 16 is the selected device, depressing volume control buttons 10b on remote 10 will cause the remote 10 to emit volume control commands in accordance with the stereo's 16 command protocol, thereby changing the volume of the stereo. Since the command protocols for the stereo 16 are different from the television 12, changing the volume of the stereo 16 using the remote 10 will not change the volume of the television 12 and vice versa.

Other control commands well known in the art and to consumers may be sent to either the television 12, VCR 14, stereo tuner/amplifier 16 or CD player 18 when the particular device is selected in the remote 10. Once the selected device is identified in the remote, commands input by a user via the button interface on the remote 10 are likewise emitted according to the command protocol for the selected device. The format of the command protocols used between the remote 10 and the various devices of FIG. 1 are known in the prior art and are not described here. The sequence of IR signals comprising a command formatted in accordance with a command protocol for a particular device is emitted via IR light output port 10f at the front face of the remote 10. IR signals are received at IR receiving sensors 12a, 14a, 16a, 18a on the faces of television 12, VCR 14, stereo tuner/amplifier 16 and CD player 18, respectively Command protocols are described in more detail, for example, in U.S. Pat. No. 5,959,751 to Darbee et al.

Selection of the desired device (either television 12, VCR 14, stereo tuner/amplifier 16 or CD player 18) to be controlled by the remote 10 and programming the remote to use the command protocols corresponding to the selected device are performed automatically in accordance with the invention. The device automatically selected by the remote corresponds to the device at which the remote 10 is pointed by the user.

In order to establish which device the remote 10 is pointed at, there is a two-way communication capability and protocol between the remote 10 and the available devices (comprised of television 12, VCR 14, stereo tuner/amplifier 16 and CD player 18). Thus, remote 10 not only comprises an IR output port 10f, but also includes an IR light sensor 10g on the front face of remote 10 that detects incident IR light for decoding and processing by the remote 10. In addition, the devices, namely, television 12, VCR 14, stereo tuner/amplifier 16 and CD player 18 each include an IR light output port 12b, 14b, 16b, 18b, respectively, for outputting a sequence of IR pulses generated by the respective device.

IR sensor 10g on the front of remote 10 is a narrow field of view IR sensor, which are widely available commercially. The field of view of IR sensor 10g is, for example, 10°. IR light emitted by the output port (either IR light output port 12b, 14b, 16b or 18b) of the device at which the user points the remote will be within the field of view of the IR sensor 10g (in this case, 10°) and thus is detected by the remote 10. For example, referring back to FIG. 1, the remote 10 is shown pointed at television 12. The field of view (of 10°) of the IR sensor 10g of the remote is shown as cone 20 that intersects the plane of the television 12 as circle 22.

Although the narrow field of view of sensor 10*g* is represented as symmetric about its central axis (resulting in a circular field of view as shown), other shapes of the field of view are possible depending on the sensor. In general, however, the narrow field of view of the sensor 10*g* will capture only IR light emitted by the IR light output port of the device at which it is pointing. Thus, as shown in FIG. 1, IR sensor 10*g* will only capture light emitted by IR output port 12*b* of television 12, since port 12*b* is the only port that lies within circle 22, that is, within the field of view of IR light sensor 10*g* on the remote 10.

It is possible that the field of view of IR sensor 10*g* will envelop the IR output port of two devices. For example, in FIG. 1, if the remote 10 were to be pointed at the lower portion of television 12, the edge of the field of view represented by the circle 22 may also envelop the IR output port 14*b* of VCR 14. However, the IR signal received from the IR output port of the device in the center of the field of view (that is, output port 12*b* of television 12) will generally be stronger than the signal received from the device at the edge of the field of view (that is, from output port 14*b* of VCR 14). Thus, remote 10 may also include a filter or the like that removes the weaker IR signal received by the remote 10 and processes the stronger signal received from the device at which the remote 10 is pointed.

Each device emits an IR signal from its respective IR light output port that provides the appliance code for the device. Thus, television 12 emits a signal via its IR output port 12*b* that provides the particular appliance code for television 12. Likewise, VCR 14 emits a signal via its IR output port 14*b* that provides the appliance code for VCR 14, stereo tuner/amplifier 16 emits a signal via its IR output port 16*b* that provides the appliance code for stereo tuner/amplifier 16*b* and CD player 18 emits a signal via its IR output port 18*b* that provides the appliance code for CD player 18.

Figure 1B:
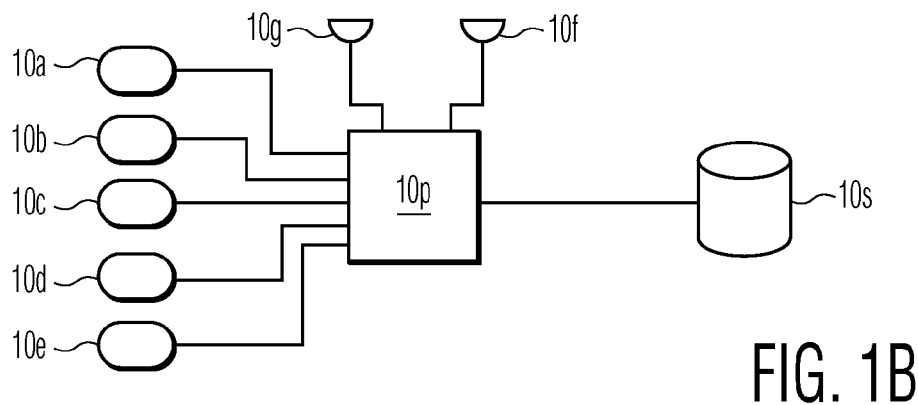

The signals emitted by each device providing its respective appliance code is in a standard format that may be decoded by remote 10 via internal processing when received. Referring to FIG. 1*b*, a number of exemplary components of the remote of FIG. 1*a* that provide the processing of the received IR signal are represented. Internal processing may be performed, for example, by microprocessor 10*p* with appropriate attendant software or other digital algorithms. Microprocessor 10*p* receives input from IR light sensor 10*g* and input buttons 10*a*–10*e* and provides control signals (which may be via intermediary devices, such as an IR LED, not shown) for IR output port 10*f*. Microprocessor 10*p* interfaces with database 10*s*, which may be internal to microprocessor 10*g* and may also provide temporary storage for microprocessor 10*p*.

Although all devices in the room of FIG. 1 emit an IR signal from IR light output ports 12*b*–16*b*, as described above, however, because of the narrow field of view of the sensor 10*g* (along with other electronic processing if necessary), the remote 10 will only receive and process the IR signal emitted by the device at which it is pointed. Thus, for example, if remote 10 is pointed at television 12 as shown in FIG. 1, IR sensor 10*g* of remote 10 will only receive and process the IR signal giving the appliance code of the television 12 emitted via its IR output port 12*b*. Processor 10*p* of remote 10 then decodes the appliance code of the television 12 received from IR light sensor 10*g*. Using the appliance code for the television 12, the associated command protocols for the television 12 are retrieved from the comprehensive database 10*s* of devices in the remote 10. Any control command input by the user via the button interface 10*a*–10*e* of the remote (shown in FIGS. 1*a* and 1*b*) are thus formatted by processor 10*p* according to the command protocols for the television 12 and output by the remote at the IR output port 10*f*.

Thus, remote 10 automatically outputs commands formatted for the device at which the remote 10 is pointed. If remote 10 is moved by the user so that it is pointed at another device, for example, the CD player 18, remote 10 receives (via sensor 10*g*) and processes the appliance code for the CD player 18 emitted by the IR output port 18*b* of CD player 18. As described above, because of the narrow field of view of sensor 10*g* (along with other electronic processing to eliminate any weaker IR signals, if necessary), the sensor 10*g* of remote 10 will only receive and process the appliance code it is currently pointed at, namely the CD player 18. The internal processing of the remote 10 decodes the appliance code of the CD player 18 received and uses the appliance code to retrieve the associated command protocols for the CD player 18. Any commands input by the user via the buttons on the remote 18 will be formatted to control the CD player 18, at which the remote 10 is pointed.

In this manner, the user may rapidly control successive devices without the need to first select each device on the remote before inputting a command. For example, the user may simply point the remote 10 at the television 12 and depress power button 10*a* to turn the television 12. As described above, by virtue of pointing the remote 10 at the television 12, the remote will emit the proper command ("toggle power") according to the command protocol for the television 12. The user may then point the remote 10 at the CD player 18, depress the power button 10*a* to turn the CD player 18 on, and then press the play button (located in group 10*e*) to begin play of a CD. Again as described above, by virtue of pointing the remote 10 at CD player 18, the remote will emit the proper commands ("toggle power", followed by "play") according to the command protocol for the CD player 18.

The devices may emit IR signals representing their appliance codes periodically at short intervals, for example, such that the remote 10 detects at least one emitted signal containing the appliance code from a device in less time than it takes the typical user to point the remote 10 at the device and input a control command for the device via the buttons on the remote. Alternatively, when the user points the remote 10 at a device and inputs a control command via the remote 10, the remote 10 first initiates a set-up procedure. For example, the remote 10 may emit via its IR output port 10*f* an "Identify Request" signal in a standard format. Any device that receives the Identify Request signal over its IR receiving sensors (such as sensors 12*a*, 14*a*, 16*a*, 18*a* in FIG. 1) responds by emitting its appliance code. As described above, because of the narrow field of view of the sensor 10*g* (along with other electronic processing if necessary), remote 10 will only receive and process the appliance code emitted by the device at which it is pointed. The remote 10 selects the command protocol from its database for the identified appliance code and transmits the control command input by the user formatted according to the command protocol. Accordingly, the device at which the remote is pointing receives the command input by the user in the appropriate command protocol.

Figure 2:
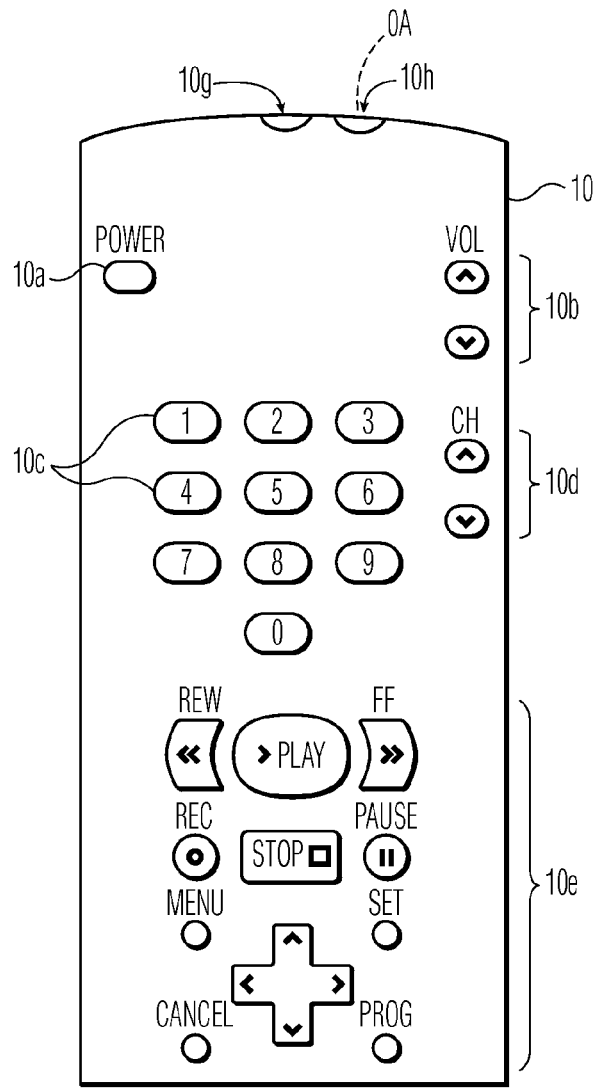
FIG. 2 is a detailed view of a remote control unit according to a second embodiment of the invention.
Figure 2A:
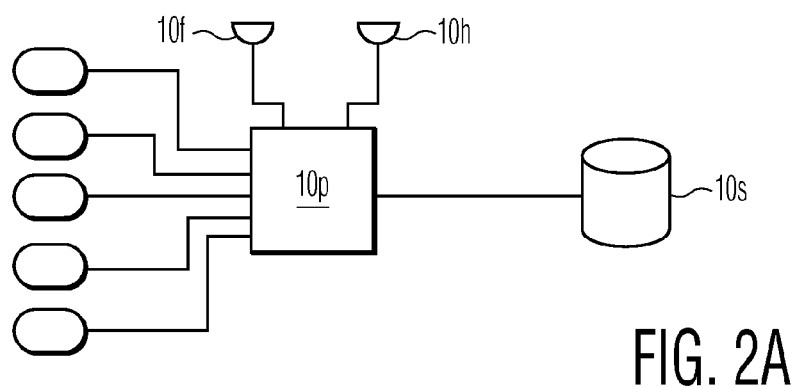
FIG. 2a is a representation of a number of components comprising the remote of FIG. 2.

In an alternative variation of the embodiment shown in FIG. 1, remote 10 includes camera optics that capture and provide images to the remote's processor. Thus, as shown in FIG. 2, remote 10 appears substantially as in FIG. 1*a*, except the IR sensor 10*g* (and associated processing for decoding the IR signals containing the appliance code emitted by the devices) is omitted and camera optics 10*h* are present on the top end of the remote 10. The optic axis (OA in FIG. 2) of the camera optics 10$h$ lies along the length of the remote 10, so the user also points the optic axis of the camera 10$h$ at the desired device when the remote is pointed at the device. The device intended to be controlled by the user will therefore be located substantially in the center of the image captured by the camera optics 10$h$.

As shown in FIG. 2$a$, remote 10 of FIG. 2 comprises substantially the same internal components as in the embodiment shown in FIG. 1$b$. In FIG. 2$a$, of course, processor 10$p$ of remote 10 is connected with camera optics 10$h$. In addition, the software (or other digital algorithms executed by processor 10$p$) comprises image recognition software that supports the embodiment and database 10$s$ stores data as further described below.

When an image is captured by camera optics 10$h$ and received by the processor 10$p$, image recognition software executed by processor 10$p$ focuses on identifying an object in the center of the image, where the device is likely to be located. The comprehensive database 10$s$ of command protocols associated with various devices in the remote 10 of this embodiment includes a detailed digital representation of the face of each device that is associated with the command protocols for the device. The detailed digital representations of the faces of each device, for example, comprise templates of the face of each device that are used by the processor of the remote 10 in an image recognition processing routine to identify a device that is located at the center of an image that is captured by the remote. When a match is detected between a stored template for a device and the object in the center of the captured image, the command protocols associated with the stored template for the device are used by the remote.

Figure 3:
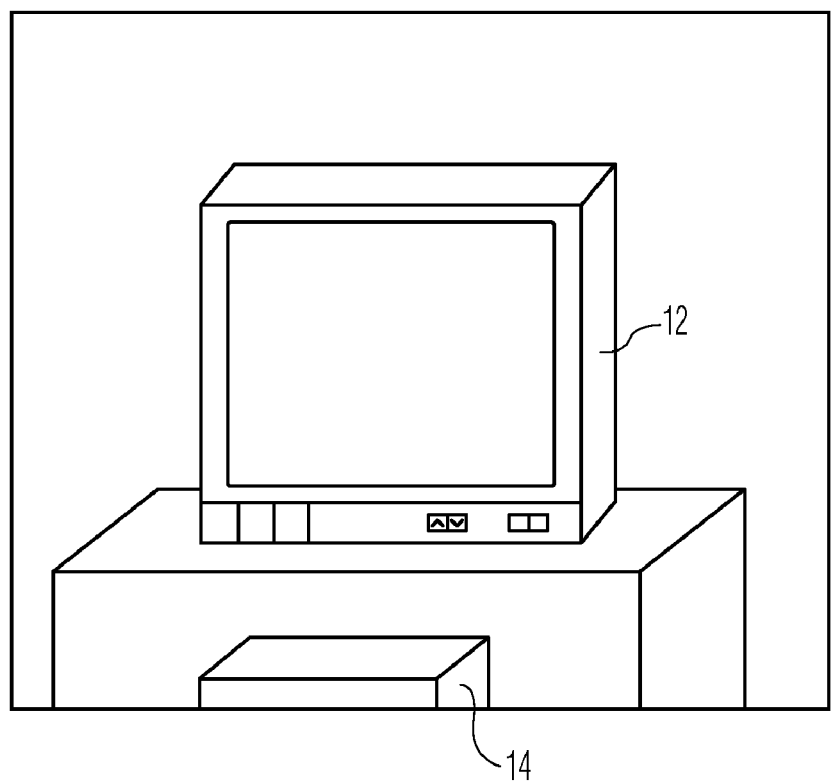
FIG. 3 is a view of an image captured by the remote of FIG. 2.
Figure 4:
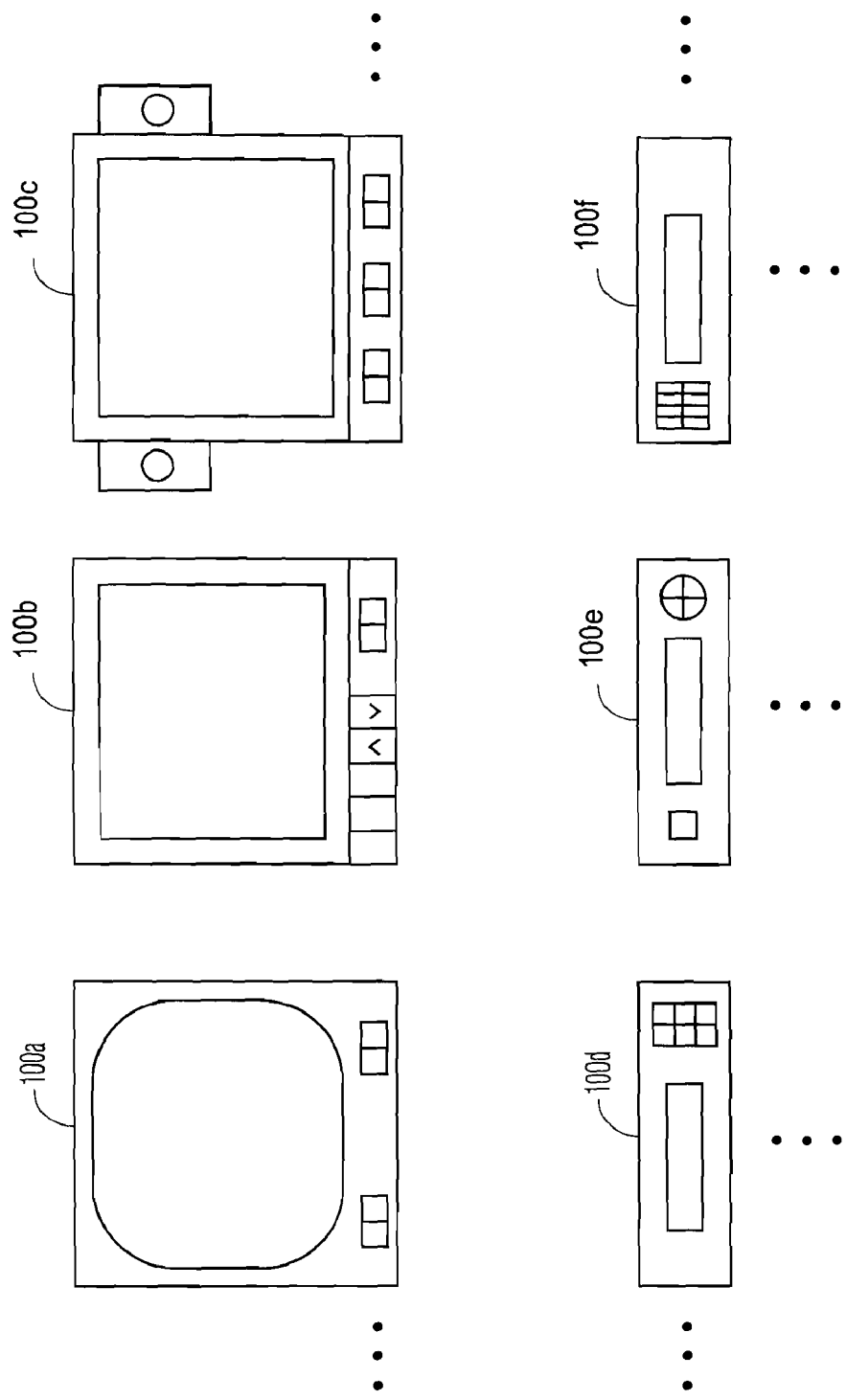
FIG. 4 is a representative view of a portion of a database of templates stored in the remote of FIG. 2.

For example, FIG. 3 depicts the image captured by the camera optics 10$h$ of remote 10 when pointed as shown in FIG. 1. (The field of view of the camera optics 10$h$ is not necessarily a narrow field of view as for the sensor 10$g$ of the prior embodiment; thus, as shown the image shown in FIG. 3 may be different from the dashed circle of FIG. 1.) Of course, television 12 is shown to be in the center of the image of FIG. 3, since the remote 10 is pointed at the television 12 in FIG. 1. Referring to FIG. 4, the comprehensive database of templates of devices stored in database 10$s$ of remote 10 of FIG. 2$a$ is represented. The templates represented in FIG. 4 are, of course, stored digitally in the remote. The templates are a collection of the templates of the front faces of many devices available from various manufacturers. For example, as shown in FIG. 4, templates are stored for various models and makes of televisions (a number of which are represented in FIG. 4 as televisions 100$a$, 100$b$ and 100$c$) and VCRs (a number of which are represented in FIG. 4 as VCRs 100$d$, 100$e$ and 100$f$). As represented by the series of dots ("...") in FIG. 4, templates for many other models and makes of televisions, VCRs and other devices (such as CD players, stereo tuner/amplifiers, DVD players etc.) are also stored in the database.

As noted above, the templates as represented in FIG. 4 that are stored digitally in the remote 10 are a collection of the templates of the front faces and associated command protocols of many devices available from various manufacturers. Typically, the remote 10 will come with the comprehensive collection of templates and associated command protocols for many commonly available devices pre-loaded in database 10$s$. In addition, for a device that is introduced after the sale of the remote (or for a device that is otherwise not included in the database 10$s$), the template and command controls may be available for downloading to the user's PC from a diskette or CD that comes with the device, or from a manufacturer's website. The template and command protocols may then be transferred from the user's PC to the database 10$s$ (or a separate programmable non-volatile memory in the remote) via a USB connection, for example.

When processor 10$p$ of remote 10 of FIG. 2$a$ receives a captured image from camera optics 10$h$, it attempts to match a template in its database 10$s$ with the object in the center of the captured image. Initially, processor 10$p$ may attempt to identify the shape of the device in the center of the image in order to reduce the number of comparisons that need to be made with the stored templates. Thus, for example, processor 10$p$ may first determine that the object in the middle of the image of FIG. 3 is approximately a square shape. Having made the initial determination, processor 10$p$ then attempts to match templates in its database 10$s$ having a square shape (among them, televisions 100$a$, 100$b$, 100$c$ of FIG. 4) with the object. When a template is found in the database 10$s$ that best matches the object in the center of the image, the command protocol associated with the best matching template is used by the remote to provide commands.

For example, after comparing the templates of television devices in the database 10$s$, processor 10$p$ may determine that template 100$b$ of FIG. 4 stored in database 10$s$ best matches the television 12 at the center of the image of FIG. 3. (The processor may have to digitally rotate and scale the template or the object in the image to make the comparisons.) Having determined that the television 12 corresponds to the model and make of the television represented by template 100$b$ in the database 10$s$, processor 10$p$ uses the command protocols associated in the database 10$s$ with that template (which represents a particular make and model television) when a command is input by the user.

The image recognition software may be adapted from the method of detecting pedestrians and traffic signs as described in "Real-Time Object Detection For "Smart" Vehicles" by D. M. Gavrila and V. Philomin, Proceedings of IEEE International Conference On Computer Vision, Kerkyra, Greece 1999 (available at www.gavrila.net), the contents of which are hereby incorporated by reference herein. A template hierarchy is capable of capturing a variety of object shapes in the image by extracting a binary feature image and creating a Distance Transform ("DT") image thereof. The binary templates (as represented, for example, in FIG. 4) are transformed into DT templates before comparison with the DT image. One of a number of matching measures are used to determine a match, for example, a match may be found when the average distance to the nearest feature is a minimum or below a user supplied threshold.

In an improvement of such matching processing described in the "Real-Time Object Detection For "Smart" Vehicles" document, matching is achieved using a variant of Distance Transform based-matching, that uses a simultaneous coarse-to-fine approach over the shape hierarchy and over the transformation parameters. Thus, similar templates are grouped together, for example, square templates (100$a$, 100$b$, 100$c$, etc.) for the televisions of FIG. 4, rectangular templates (100$d$, 100$f$, 100$g$, etc.) for the VCRs, as well as other appliances. Each group of shapes is represented by a prototype template and matching with the DT image is first performed using the prototypes, rather than the actual templates comprising the group. After determination of the best match with a prototype template, the individual templates comprising the group stored in database 10$s$ are compared with the DT image.

For example, a prototype DT template of a square (generically representing televisions), rectangle (generically representing VCRs), etc. may first be compared by the processor 10$p$ of the remote 10 with the DT image of the television 12 of FIG. 3. The prototype DT template of a square will have the best match with the DT image of the television 12 of FIG. 3. After such a determination, the processor 10$p$ uses the individual (square) templates of the televisions 100$a$, 100$b$, 100$c$, etc. of FIG. 4 stored in database 10$s$ that comprise the group represented by the square prototype for further comparison and determines the best match.

The actual templates may also be further grouped into sub-classifications of similarities and each sub-classification may be represented by a prototype template that represents the similarity of actual templates in the sub-classification. By matching prototype templates for successive sub-classifications of similarities with the DT image, comparing the number of templates that represent actual devices with the DT image is reduced to those templates comprising the group of the prototype template for the final sub-level.

For example, televisions may be sub-classified as having a square screen or a oval screen. After it is determined that a square prototype template matches the DT image of the television in FIG. 3, a second level (sub-classification) of square prototype templates may be compared with the image. Two prototype templates may be in the second level, one having a square boundary and a square interior border (representing a square screen) and another having a square boundary and an oval interior border (representing an oval screen). Televisions 100$b$, 100$c$ of FIG. 4 (having square screens) would be among those comprising the group represented by the prototype template with the oval interior boundary and television 100$c$ of FIG. 4 (having an oval screen) would be among those actual templates comprising the group represented by the prototype with the oval interior boundary. After comparing the DT image of the television 12 of FIG. 3 with the prototype templates in the second level, the processor 10$p$ will conclude (based on the relative measures of matching) that the prototype template with the square boundary is the best match with the DT image of FIG. 3. After such a determination, the processor 10$p$ retrieves from database 10$s$ the templates of the televisions 100$b$, 100$c$, etc. comprising actual devices in the group represented by the matching second level prototype for further comparison and determines the best match.

Once the processor 10$p$ of the remote 10 determines which template stored in the comprehensive database 10$s$ matches the object in the image, the command protocols associated with the template (which represents a particular make and model device) are used by the remote 10 when commands are input by the user. For example, as previously noted, after the stored templates of FIG. 4 are compared with the image of the television 12 in FIG. 3, the processor 10$p$ in the remote 10 determines that template 100$b$ matches the object (television) 12 in the center of FIG. 3. Command protocols for the make and model of television 12 represented by template 100$b$ are associated with template 100$b$ in the database 10$s$ and these command protocols are used by the processor 10$p$ when the user inputs a command to the remote 10. Thus, by pointing the remote 10 at the desired device, the remote automatically identifies the command protocol for the device and emits commands using the identified command protocol.

In addition, once a number of templates in the database 10$s$ have been identified by the remote 10 as corresponding to devices that are selected by the user, the processor 10$p$ may first compare those previously identified templates with the image captured and determine whether the matching measure for one of the previously identified templates is approximately the same as when the device was last identified. If one of the smaller number of previously identified templates matches the object in the image to substantially the same degree, the processor 10$p$ determines it is a match and uses the command protocols associated with the matching template. Also, the stored templates corresponding to devices in a room may be identified and updated by the user initiating a learning procedure by depressing a button on the remote 10. When the user points the remote at a device in the room and initiates the learning procedure, the remote matches the image of the device with a template and associated command protocols for the device, as described above. The learning procedure is conducted for each device the user wants to control, and can be updated when new devices are added or removed. After such a learning procedure is performed, when the user points the remote at a device, the processor 10$p$ only considers those templates for the devices previously identified when determining a match. This reduces the response time of the remote considerably. Also, because the remote only chooses a match for a device among templates for devices owned by the user, the matching is faster and more reliable.

Alternatively, devices may come with an ascribed feature, that may be readily identified in an image processing routine. A bar code (or the like), for example, may be affixed to the front of each controllable device. In that case, the comprehensive database 10$s$ in the remote 10 will include a bar code for each device and the device's corresponding command protocols. The image captured by the camera of the remote is searched for a bar code and, once found, the bar code is analyzed and decoded. Once decoded, the command protocols for the identified device are retrieved from the database and used.

As described for the first embodiment of the invention, the remote may capture images via camera optics 10$h$ periodically and apply the image recognition processing to match a device located in the center of the image. The time interval between successive capture and processing of an image would be less than the average time it would take a user to enter a command after pointing the remote. Alternatively, the input of a control command by the user using the buttons of the remote may initiate the image capture and processing for the device at which the remote is pointed, as described above. Once the command protocol for the device in the center of the captured image is identified, the control command input by the user is emitted according to the command protocol.

The second variation of the invention described immediately above, which relies on image processing in the remote to identify the device at which the remote is pointing, and the first variation of the invention previously described, which relies on the device emitting an IR signal giving its appliance code, may also be implemented together in the same universal remote and system. In that case, remote 10 will be a hybrid of the remotes 10 of FIGS. 1$a$ and 2, namely, it will have both an IR light sensor 10$g$ and camera optics 10$h$. One determination of the make and model of the appliance (made, for example, using an appliance code received via an IR signal) may be used to confirm another determination (made, for example, using template matching in an image processing routine). Where the device determinations made using the IR signal and image processing do not agree, an error subroutine may be invoked by processor in the remote 10. For example, the template corresponding to the appliance code of the IR signal may be retrieved from the database and compared with the object in the image. If its measure of matching is high, the command protocols for the appliance code of the IR signal are used. If not, then the command protocols associated with the template determined via the image processing routine are used.

In addition, it was previously noted that the user's input of an actual command using the buttons on the face of the remote could initiate the determination of the device at which the remote is pointed. Alternatively, the remote may include a separate setup button that the user may depress when pointing the remote at a device, thereby initiating the determination of the command protocols for the device at which the remote is pointed (via an IR signal giving the appliance code of the device or image recognition processing, for example). In addition, having determined the command protocols for the device, the remote 10 may use those command protocols until the user again depresses the setup button on the remote. In that case, the user can continue to control the same device even though the remote 10 may not be pointed directly at the device. Should the user wish to change devices, the remote 10 is pointed at the next device to be controlled and the setup button is again depressed.

In both variations of the embodiment above, discriminating between two (or more) devices detected by the remote 10 were described. In the first variation it was noted that filtering or like electronics could be used by the remote 10 where multiple IR signals having appliances codes were received by narrow field sensor 10g. It was presumed that the IR signal from the device at which the remote is pointed would emit the stronger signal. In the second variation it was noted that the image recognition processing would create a DT image for the object most closely located in the center of the captured image. If two or more objects were captured (in whole or in part) in the image, the device at which the user was pointing the remote would most likely appear in the center of the image.

However, it may often be the case that two or more devices are in close proximity and/or the remote 10 is not precisely aimed at the desired device by the user. For example, if the remote 10 in FIG. 1 is aimed at the bottom of television 12, IR output ports 12b, 14b of television 12 and VCR 14 would both be located well inside the narrow field of view 22, so IR signals emitted by television 12 and VCR 14 detected by the remote 10 may have approximately equal strength. (Also, the strength of the IR signals emitted by different devices may be different or the device at the center of the field of view may be further away than the device at the periphery; thus, the IR signal from the device at which the remote 10 is pointing may be weaker than the nearby device.) If image recognition is used by the remote 10 to identify the device, it may also be difficult for the processing to identify whether the television 12 or the VCR 14 is located in the "center" of the captured image.

Where the remote may be pointing at one of two or more devices, the remote 10 may identify all of the devices to the user and require the user further select which device is intended to be controlled. For example, if the remote 10 is pointed such that it receives IR signals of the appliance codes for both the television 12 and the VCR 14 in FIG. 1, the processing within the remote 10 may look-up and retrieve a description of the make and model of both devices in the database using the appliance codes received as described for the first variation above. The remote 10 may then display a description of the devices on an LCD or other display in the remote 10. For example, the remote may display "Toshiba model M61 television" for television 10 and "Panasonic model PM3 VCR" for VCR 12 on the remote's display. The user selects which device is intended to be controlled via a button or other input to the remote.

Once selected, the processor retrieves the command protocols from the database for the selected device (in the example, either the TV 12 or the VCR 14) and uses them for any commands input by the user.

Similarly, for example, if the remote 10 is pointed such that it cannot be determined whether the television 12 or the VCR 14 are located at the center of an image, the processing within the remote 10 may perform image recognition (using template matching, for example) for both objects in a central region of the image. The make and model of devices stored in the database associated with templates that best match the objects in the image are determined as described for the second variation above. The remote provides the description of the makes and models of the identified devices to the user and the user selects the intended device. Once selected, the remote uses the command protocols in the memory that are associated with the selected device.

Figure 5:
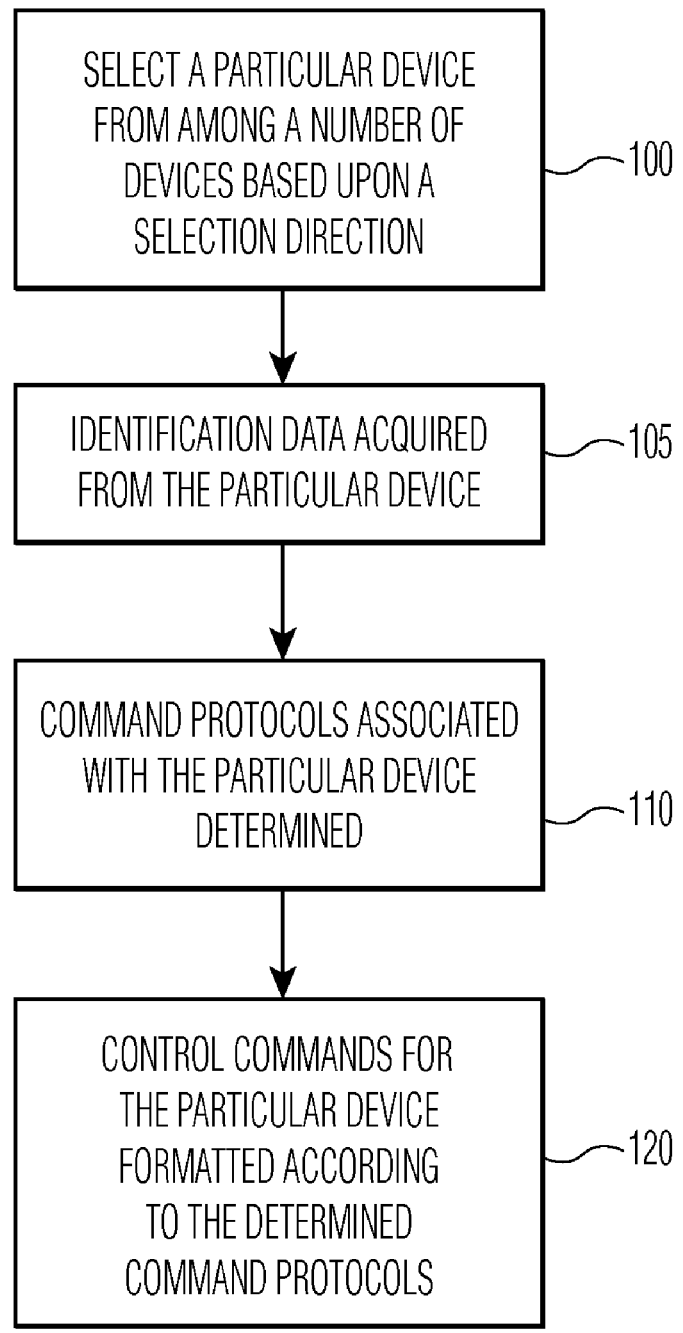
FIG. 5 is a flowchart of an embodiment of a method in accordance with the present invention.

Referring to FIG. 5, a general flowchart of a method according to the invention is given. In step 100, a particular device is selected from among a number of devices based upon a selection direction. For example, in the case of the remote of the prior embodiments, the selection direction is the direction in which the user points the remote. In step 105, identification data is acquired from the particular device. This may be, for example, an IR signal containing the appliance code transmitted from the device, or may be a captured image of the device, as in the previously described embodiments. In step 110, command protocols associated with the particular device are determined using the identification data. Where, for example, the identification data is an IR signal containing the appliance code, the appliance code may be used to consult a compilation of appliance codes for devices and their associated command protocols. The command protocols associated in the compilation with the appliance code of the particular device is selected. Where the identification data comprises an image of the particular device, the image may be used to find a matching image representation in a compilation of image representations for devices and their associated command protocols. The command protocols associated in the compilation with the image representation that matches the image of the device is selected. In step 120, control commands for the particular device are formatted according to the determined command protocols.

Although illustrative embodiments of the present invention have been described herein with reference to the accompanying drawings, it is to be understood that the invention is not limited to those precise embodiments. For example, the command protocols associated with an identified device have been described as being retrieved from a comprehensive database in the remote once the device at which the remote is pointing is identified. Alternatively, for example, the remote may receive a wireless download of the command protocols from the device at which it is pointing, for example, via the narrow field IR light sensor 10g of the previously described embodiment. Thus, it is intended that the scope of the invention is as defined by the scope of the appended claims.

What is claimed is:

1. A remote control unit for controlling a number of devices, the remote control unit comprising:
   a receiver for acquiring identification data from a particular device at which the remote control unit is pointed;
   a processor for processing the acquired identification data to determine command protocols associated with the particular device; and a formatter for formatting control commands for the particular device according to the command protocols associated with the particular device, wherein the receiver acquires identification data from the particular device at which the remote control unit is pointed by capturing at least one image in the direction in which the remote control unit is pointed, the at least one captured image including the particular device.

2. The remote control unit as claimed in claim 1, wherein the receiver comprises a camera for capturing images in the direction in which the remote control unit is pointed.

3. The remote control unit as claimed in claim 1, wherein the processor processes the captured image to identify the particular device at which the remote control unit is pointed.

4. The remote control unit as claimed in claim 3, wherein the processor identifies the particular device in the captured image using image recognition processing.

5. The remote control unit as claimed in claim 4, wherein the remote control unit comprises a database containing representations of images of the number of devices and their associated command protocols, the processor determining a representation of an image in the database that matches the particular device in the captured image, and the formatter using the command protocols associated with the representation of the image in the database to format input control commands.

6. The remote control unit as in claim 1, wherein the receiver acquires identification data from the particular device at which the remote control unit is pointed after the user inputs an acquisition command in the remote, wherein, after the processor processes the identification data acquired to determine command protocols associated with the particular device, the formatter formats control commands for the particular device input to the remote by the user according to the command protocols associated with the particular device until the user inputs another acquisition command.

7. The remote control unit as claimed in claim 1, wherein the remote control unit further comprises a display for displaying information, and the receiver acquires identification data from two or more particular devices at which the remote control unit is pointed, the processor processing the identification data and displaying on the display the identity of the two or more particular devices to the user, the remote control unit further comprising an input for receiving a user selection input selecting one of the two or more particular devices identified, the processor determining command protocols associated with the selected device, and the formatter formatting control commands for the selected particular device input to the remote by the user according to the command protocols associated with the selected particular device.

8. A method for controlling one particular device selected from among a number of devices based upon a selection direction, the method comprising the steps of:

acquiring identification data from the particular device;

determining command protocols associated with the particular device using the identification data; and formatting control commands for the particular device according to the determined command protocols for the particular device, wherein the step of acquiring identification data from the particular device comprises capturing one or more images of the particular device.

9. The method as claimed in claim 8, wherein the step of determining command protocols associated with the particular device using the identification data comprises using the image to find a matching image representation in a compilation of image representations for the number of devices and their associated command protocols and selecting the command protocols associated in the compilation with the image representation that matches the image of the particular device.

* * * * *